US009161338B2

(12) United States Patent
Lunttila et al.

(10) Patent No.: US 9,161,338 B2
(45) Date of Patent: Oct. 13, 2015

(54) SUPPORTING DYNAMIC MULTIPOINT COMMUNICATION CONFIGURATION

(75) Inventors: Timo Erkki Lunttila, Espoo (FI); Xiao Yi Wang, Beijing (CN); Peter Skov, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/978,889

(22) PCT Filed: Jan. 10, 2011

(86) PCT No.: PCT/CN2011/070148
§ 371 (c)(1),
(2), (4) Date: Jul. 10, 2013

(87) PCT Pub. No.: WO2012/094802
PCT Pub. Date: Jul. 19, 2012

(65) Prior Publication Data
US 2013/0281104 A1 Oct. 24, 2013

(51) Int. Cl.
*H04W 72/04* (2009.01)
*H04L 5/00* (2006.01)

(52) U.S. Cl.
CPC ............... *H04W 72/04* (2013.01); *H04L 5/005* (2013.01); *H04L 5/0023* (2013.01); *H04L 5/0051* (2013.01)

(58) Field of Classification Search
USPC .................................. 455/436–438, 442, 450
See application file for complete search history.

(56) References Cited

U.S. PATENT DOCUMENTS

| 2010/0144334 A1* | 6/2010 | Gorokhov et al. ............ 455/418 |
| 2010/0273492 A1 | 10/2010 | Liu et al. ........................ 455/446 |
| 2010/0285810 A1 | 11/2010 | Ko et al. ........................ 455/450 |
| 2010/0322176 A1 | 12/2010 | Chen et al. .................... 370/329 |

FOREIGN PATENT DOCUMENTS

| CN | 101815331 A | 8/2010 |
| CN | 101925183 A | 12/2010 |
| JP | 2010/154262 A | 7/2010 |
| WO | WO 2008/155143 A1 | 12/2008 |
| WO | WO 2010/048743 A1 | 5/2010 |
| WO | WO 2010/147882 A2 | 12/2010 |

OTHER PUBLICATIONS

3GPP TSG RAN WG1 Meeting #58; Shenzen, China, Aug. 24-28, 2009; "Distributed Dynamic CoMP for LTE-Advanced"; Tokyo Institute of Technology, KDDI; R1-093608; 18 pgs.
3GPP TR 36.814 V9.0.0 (Mar. 2010); 3GPP; Technical Specification Group Radio Access Network; Evolved Universal Terrestrial Radio Access (E-UTRA); Further advancements for E-UTRA physical layer aspects (Release 9); 104 pgs.

(Continued)

*Primary Examiner* — Sam Bhattacharya
(74) *Attorney, Agent, or Firm* — Harrington & Smith

(57) ABSTRACT

An apparatus, method and computer program product for supporting dynamic multipoint communication configuration stations include defining at least two different communication transmission sets for cellular-based communication between base station and terminal, wherein the communication transmission sets are related to a downlink reference signal configuration; and assigning a communication transmission set for use in a current transmission related to the cellular-based communication.

22 Claims, 3 Drawing Sheets

Defining different Communication Transmission Sets (S1)

Assigning Communication Transmission Set based on Cell Coverage (S2)

(56) References Cited

OTHER PUBLICATIONS

R1-093948; Panasonic; "CoMP Operation Image and UE demodulation/feedback Configuration"; 3GPP TSG RAN WG1 Meeting #58b; Miyazaki, Japan, Oct. 12-16, 2009 (3 pages).

R1-100376; Panasonic; Standardization Impact of DL Multi-antenna Operation; 3GPP TSG RAN WG1 Meeting #59b; Valencia, Spain, Jan. 18-22, 2010.

* cited by examiner ved Node B and user
SUPPORTING DYNAMIC MULTIPOINT COMMUNICATION CONFIGURATION

FIELD OF THE INVENTION

The present invention relates to an apparatus, method and computer program product for supporting dynamic multipoint communication configuration stations. In particular, the present invention relates to an apparatus, method and computer program product for supporting dynamic multipoint communication configuration in evolved Node Bs and user equipment.

RELATED BACKGROUND ART

Prior art which is related to this technical field can e.g. be found by the technical specifications of the 3GPP 36 series standard. Particular reference is made to TS 36.814 (current version: 9.0.0) of the 3GPP.

The following meanings for the abbreviations used in this specification apply:
3G: $3^{rd}$ Generation
3GPP: $3^{rd}$ Generation Partnership Project
CoMP: Coordinated Multi-Point Transmission
CRS: Common Reference Symbols
CSI-RS: Channel State Information Reference Symbols
CQI: Channel Quality Indicator
DCI: Downlink Control Information
DL: Downlink
DM RS: Demodulation Reference Symbols
DRS: Dedicated (UE-Specific) Reference Symbols
eNB: evolved Node B (base station)
ID: Identifier
LTE: Long Term Evolution
LTE-A: Long Term Evolution Advanced
PDCCH: Physical Downlink Control Channel
PDSCH: Physical Downlink Shared Channel
PMI: Precoding Matrix Indicator
RI: Rank Indicator
RRC: Radio Resource Control
RS: Reference Signal
TM: Transmission Mode
TX: Transmit (ter)
UE: User Equipment Recently, in LTE-Advanced related standardization meetings it is under discussion whether data transmission from multiple cells towards one user should be supported. Such data transmission from multiple cells towards one user is also called Coordinated Multipoint Transmission (CoMP).

Since the present discussion merely focuses on rather general aspects, there is a need for detail solutions related to the technical implementation.

SUMMARY OF THE INVENTION

Therefore, it is an object of the present invention to provide such detail solution which in the present case is related to supporting dynamic multipoint communication configuration.

According to a first aspect of the present invention, this is accomplished by an apparatus, comprising communication configuration means configured to define at least two different communication transmission sets for cellular-based communication between base station and terminal, wherein the communication transmission sets are related to a downlink reference signal configuration; and communication transmission set switching means configured to assign a communication transmission set for use in a current transmission related to the cellular-based communication.

Modifications of the first aspect may be as follows.

The apparatus according to the first aspect may be configured to be suitable for supporting dynamic multipoint communication configuration stations.

Further, a first communication transmission set can correspond to a single cell transmission and a second communication transmission set can correspond to a transmission involving two neighboring cells with overlapping coverage area forming a serving sector and a neighboring sector.

The two neighboring cells with overlapping coverage area can each be served by the same base station.

The second communication transmission set can comprise information selected from the group comprising a vertical shift in the common reference signal patterns between the neighboring cells, the identities of the neighboring cells and a transmission sequence of the neighboring cells.

The second communication transmission set can include information to trigger the terminal using an operation mode in which antenna ports of the neighboring sector are considered virtual antenna ports consecutively adding to the antenna ports of the serving sector.

A definition of a communication transmission set can relate to radio resource control signaling.

The communication transmission set switching means can be configured to assign a communication transmission set based on downlink assignment signaling related to the current transmission.

According to a second aspect of the present invention, the object is accomplished by an apparatus, comprising a communication configuration processor configured to define at least two different communication transmission sets for cellular-based communication between base station and terminal, wherein the communication transmission sets are related to a downlink reference signal configuration; and a communication transmission set switching processor configured to assign a communication transmission set for use in a current transmission related to the cellular-based communication.

Modifications of the second aspect of the present invention may correspond to the modifications of the first aspect.

According to a third aspect of the present invention, the object is accomplished by an evolved Node B and User Equipment, respectively, comprising an apparatus according to the first or second aspect of the present invention or any one of their modifications, wherein the user equipment further comprises an information sharing processor configured to initiate sharing the communication transmission sets with an evolved Node B serving the User Equipment, and the evolved Node B further comprises an information sharing processor configured to initiate sharing the communication transmission sets with a User Equipment served by the evolved Node B.

According to a fourth aspect of the present invention, the object is accomplished by a method, comprising defining at least two different communication transmission sets for cellular-based communication between base station and terminal, wherein the communication transmission sets are related to a downlink reference signal configuration; and assigning a communication transmission set for use in a current transmission related to the cellular-based communication.

Modifications of the fourth aspect may be as follows.

The method according to the fourth aspect may be configured to be suitable for supporting dynamic multipoint communication configuration stations.

Further, a first communication transmission set can correspond to a single cell transmission and a second communication transmission set can correspond to a transmission involving two neighboring cells with overlapping coverage area forming a serving sector and a neighboring sector.

The two neighboring cells with overlapping coverage area can each be served by the same base station.

The second communication transmission set can comprise information selected from the group comprising a vertical shift in the common reference signal patterns between the neighboring cells, the identities of the neighboring cells and a transmission sequence of the neighboring cells.

The second communication transmission set can include information to trigger the terminal using an operation mode in which antenna ports of the neighboring sector are considered virtual antenna ports consecutively adding to the antenna ports of the serving sector.

The defining a communication transmission set can relate to radio resource control signaling.

The assigning a communication transmission set can include downlink assignment signaling related to the current transmission.

The method according to the fourth aspect or any of its modifications may be performed by the apparatus according to the first or second aspect or suitable ones of their modifications.

According to a fifth aspect of the present invention, the object is accomplished by a computer program product comprising computer-executable components which perform, when the program is run on a computer, defining at least two different communication transmission sets for cellular-based communication between base station and terminal, wherein the communication transmission sets are related to a downlink reference signal configuration; and assigning a communication transmission set for use in a current transmission related to the cellular-based communication.

Modifications of the fifth aspect may be as follows.

The computer program product according to the fifth aspect may be suitable for supporting dynamic multipoint communication configuration stations.

The computer program product according to the fifth aspect may be embodied as a computer-readable storage medium.

Otherwise, modifications of the fifth aspect may correspond to the modifications of the fourth aspect.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, supporting dynamic multipoint communication configuration in the context of LTE-Advanced is described in order to illustrate a solution to the needs of the 3GPP. However, it should be appreciated that these exemplary embodiments are not limited for use among this particular type of wireless communication system, and according to further exemplary embodiments, the present invention can be applied also to other types of cellular-based communication systems and access networks in which the feature of multipoint communication can be present.

Though, certain embodiments of the present invention relate to 3GPP LTE-Advanced. In more detail, certain embodiments of the present invention are related to the configuration of an LTE-Advanced eNB and components thereof as well as of an LTE-Advanced UE and components thereof, or the like.

However, as indicated above, the present invention is not limited to eNB and UE, but other embodiments of the present invention are related to general base station nodes and terminal nodes, respectively, and components thereof.

Figure 1:
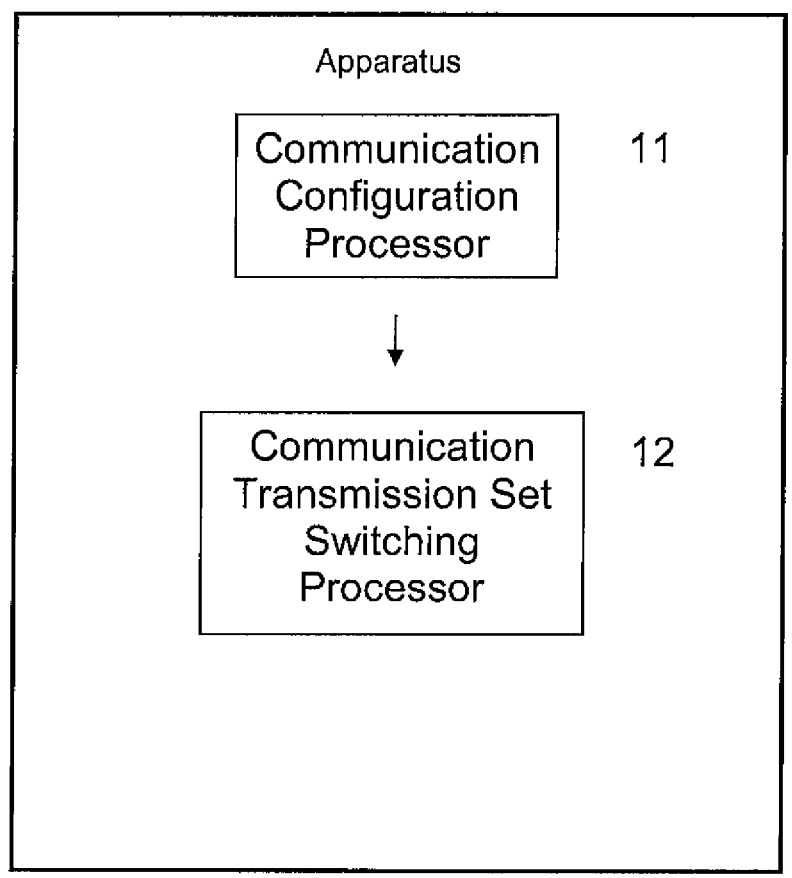
FIG. 1 shows an apparatus according to certain embodiments of the present invention.

FIG. 1 shows a principle configuration of an example for an apparatus according to certain embodiments of the present invention. One option for implementing this example for an apparatus according to certain embodiments of the present invention would be a component in an evolved Node B according to LTE-Advanced, while another option for implementing this example would be a component in a user equipment according to LTE-Advanced.

Specifically, as shown in FIG. 1, the example for an apparatus comprises a communication configuration processor (11) configured to define at least two different communication transmission sets for cellular-based communication between base station and terminal, wherein the communication transmission sets are related to a downlink reference signal configuration; and a communication transmission set switching processor (12) configured to assign a communication transmission set for use in a current transmission related to the cellular-based communication.

Figure 2:
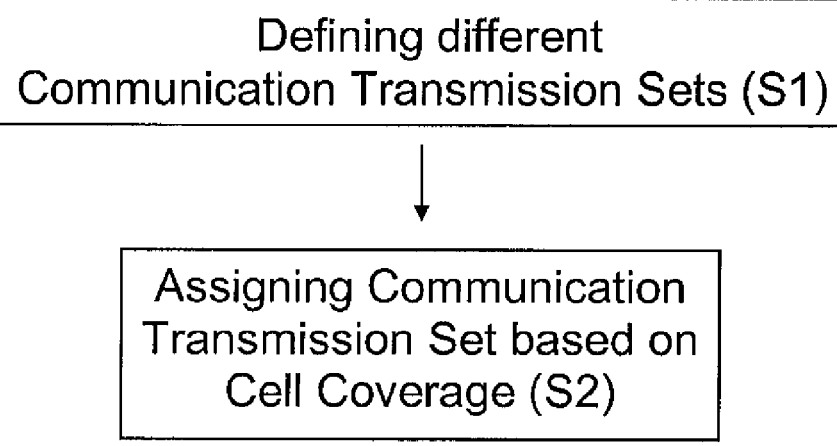
FIG. 2 shows a flow chart illustrating a method according to certain embodiments of the present invention.

FIG. 2 shows a principle flowchart of an example for a method according to certain embodiments of the present invention. That is, as shown in FIG. 2, this method comprises defining (S1) at least two different communication transmission sets for cellular-based communication between base station and terminal, wherein the communication transmission sets are related to a downlink reference signal configuration; and assigning (S2) a communication transmission set for use in a current transmission related to the cellular-based communication.

One option for performing the example of a method according to certain embodiments of the present invention would be to use the apparatus as described above or a modification thereof which becomes apparent from the embodiments as described herein below.

According to certain embodiments of the present invention, a CoMP is enabled which allows a very fast communication (practically involving zero-delay) between the cooperating eNBs. Specifically, according to the signaling mechanisms of certain embodiments of the present invention a simple CoMP implementation for initial CoMP deployments is enabled without a need for high backhaul capacity with low latency. Moreover, according to certain embodiments of the present invention an implementation example is provided for the transmission of PDSCH from multiple cells in which data symbols are punctured to provide space for the common reference signal. Namely, when multi-cell transmission is enabled the number of reference signal positions that needs puncturing could change, for which no solution is known in the prior art.

Figure 3:
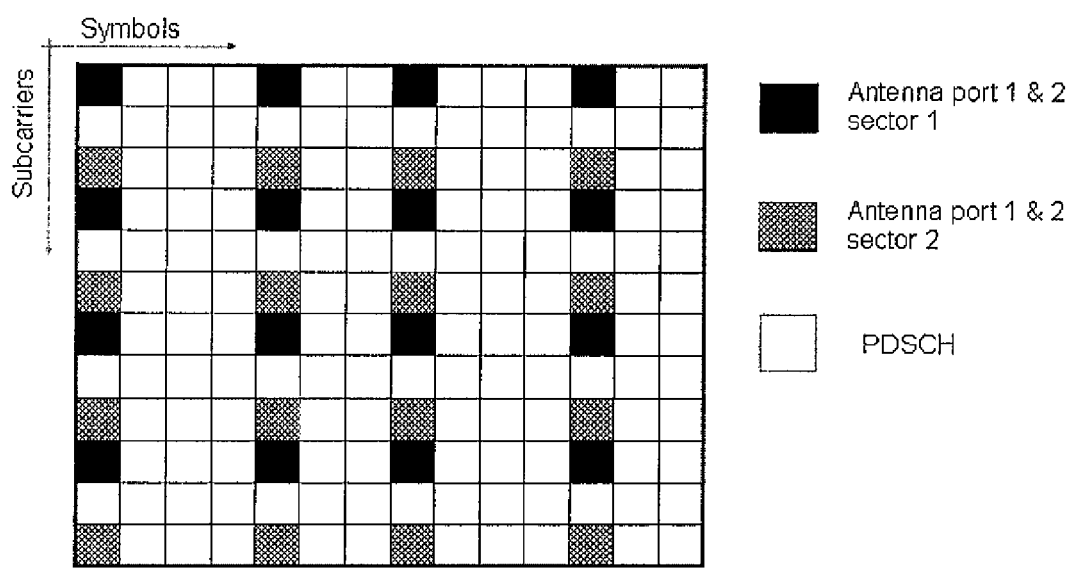
FIG. 3 shows an example for the CRS collision issue in CoMP transmission.

FIG. 3 illustrates an example of such RS collision issue showing the sequence of symbols of subcarriers. If UE is performing CoMP and both sectors 1 and 2 are transmitting data to it, normally there is some vertical shift between the CRS patterns of neighbor sectors so that the UE has to do rate-matching or puncturing on the resource elements occupied by CRS from both sectors.

According to the specification TR 36.814 of the 3GPP an approach to this issue is considering to have transmission cells configured semi-statically.

However, as there are many different aspects to be taken into account when deciding for the scheduling of the UEs, a UE configured for multi-cell transmission might not always be transmitted to from multiple cells. With semi-static configuration this would lead to an increased overhead, since the UE, when transmitted to only from single cell, would still puncture the common reference signal positions from other cells.

Figure 4:
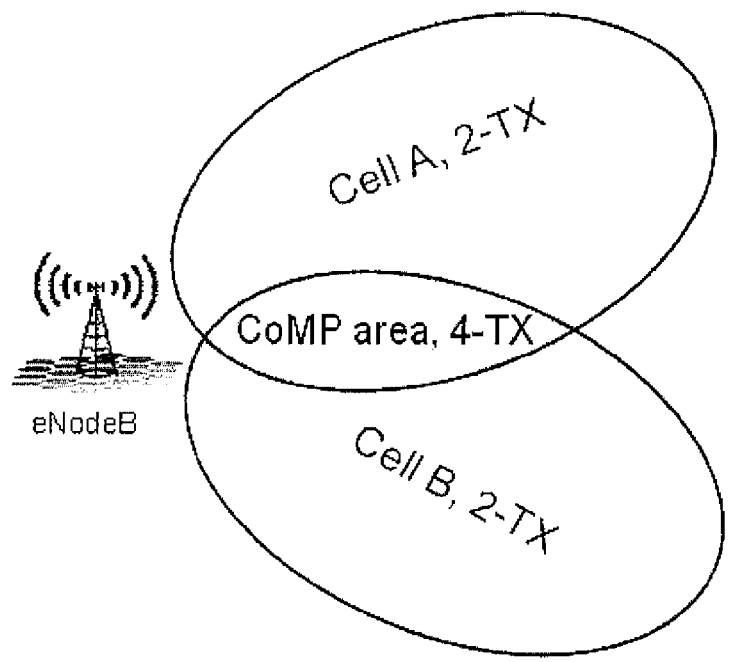
FIG. 4 illustrates a simple intra-site CoMP operation between two co-located cells, two antennas each.

Hence, according to certain embodiments of the present invention, in the simple CoMP case where coordination takes place between the two cells (sectors) of a single eNB (see FIG. 4), the UE on the border area of the two cells can benefit from the CoMP transmission from all the four antennas of the two cells (two antennas per cell, indicated by 2-TX).

Specifically, according to certain embodiments of the present invention, to support dynamic switching between single and multi-cell transmission, one or more of the following options may be implemented.

Two or more higher layer (e.g. RRC signaling) configurations are defined, where each configuration corresponds to a relevant semi-static configuration of the transmission set. For example, configuration 0 may correspond to single cell transmission (as defined in 3GPP Release 10), and configuration 1 would mean a two sector transmission, i.e. a serving sector and one neighboring sector. In the latter case, the neighboring sector's information like CRS vertical shift, the transmission sequence, the cell-id, etc. are included in the configuration and is shared between eNB and UE.

A signaling in the DL assignment by e.g. using DCI can be used to switch between the configurations. Such signaling could be established by reinterpretation of the existing DL assignment fields or by adding new bits. Also a new type of DL assignment can be defined for this purpose. The DL assignment may be present in only the UE-specific PDCCH search space or also in the common search space. Depending on the signaling the UE can correctly interpret e.g. the PMI field in the DCI e.g. using 2-TX or 4-TX codebook.

Figure 5:
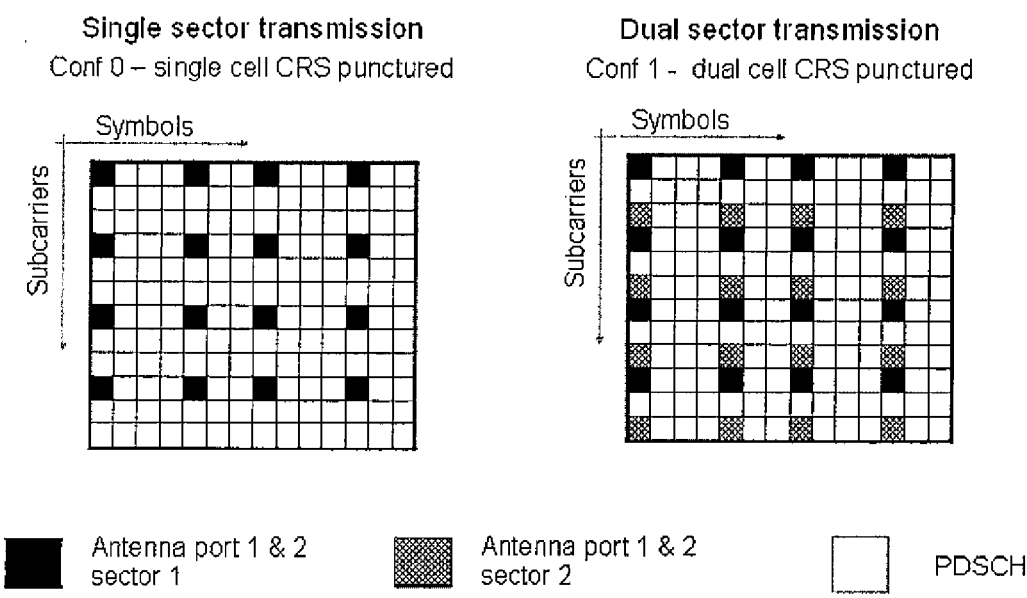
FIG. 5 illustrates an example in which a user equipment treats antenna ports from another sector as virtual antenna ports in accordance with certain embodiments of the present invention.

In the case a dual-sector transmission is indicated with the DL assignment, the UE can consider the antenna ports from neighbor sectors as "virtual antenna ports", which are perhaps associated with different CRS/CSI-RS locations, etc. As illustrated in FIG. 5, UE takes the antenna ports 1&2 from the neighboring cell as virtual antenna ports and treats them as antenna ports 3&4 (by consecutive adding to the antenna ports of the serving cell/sector) in the demodulation or in the CSI measurements. This allows for the eNB to use e.g. existing 4-TX antenna codebook and related procedures when deriving the CSI feedback for the CoMP operation.

The configurations could include details related to a reference signal configuration as follows:

In a DRS based transmission, DM RS sequences could be different between different configurations. The signaling in the DL assignment could then be combined with other DRS configuration related signaling in the DL assignment to derive the DM RS sequence.

In a CRS based transmission, multi-cell transmission based on CRS could be envisioned. As an example, UE could be configured with 4TX assignment and in case of single cell transmission the DL assignment is reinterpreted by the UE as 2TX. On the other hand, if dual cell transmission is indicated, 4TX demodulation is used (while other combinations are also possible). In this case, the UE needs all the information related to a configuration of the CRS in adjacent cell (power offsets, PCI, etc.) so that it can derive proper channel estimates. Moreover, UE could always use CSI-RS to derive the feedback (CQI, PMI, RI, single/dual cell) as the adjacent cell's CRS could be badly interfered from PDSCH transmission in its own cell.

According to certain embodiments of the present invention, specific implementation examples could be established as described below:

Considering a case where each sector has two TX antenna ports and two transmission sets have been configured for the UE (for illustration purposes, reference is again made to FIG. 5:

Config.0 corresponds to single sector transmission (where sector 1 is the serving sector of the UE).

Config.1 corresponds to dual-sector transmission (including sector 1 and sector 2), and all the relevant information on the reference signals of sector 2 are included.

When the UE is configured in a DRS based TX mode, e.g. Transmission Mode 9, the corresponding DCI format has e.g. bit (explicitly or implicitly) indicating which configuration is used for current DL assignment. If it indicates Config.0, then UE follows single cell 2TX transmission. If it indicates dual-cell transmission, the UE assumes there are four TX antenna ports for the transmission and up to four layers can be transmitted. In this case the UE does rate-matching of the received data around the CRS locations for both sector 1 and sector 2.

When the UE is configured in CRS based TX mode, the corresponding DCI format may still have 1 bit to indicate which configuration is to be used. If the DL assignment indicates config.1, the UE knows 4TX transmission is applied, and it considers antennas from the neighbor sector as virtual antenna ports and takes into account the corresponding CRS locations.

Thus, as is apparent from the above description of the preferred embodiments of the present invention, certain embodiments can achieve the following advantages:

DL CoMP can be introduced into LTE Release 11 in a most simple way. Further, it is possible to re-use LTE Release 8 codebooks and transmission schemes to a large extent (both open loop and closed loop). Still further, the proposed dynamic switching between single and multi-cell transmission makes it easier to harvest gains for the CoMP users. Eventually, the system impact (both related to standardization and implementation) is minimized, making a cost-effective introduction of the above features feasible.

According to the above description, it should thus be apparent that exemplary embodiments of the present invention provide, for example from the perspective of a network element such as an evolved Node B (eNB) and a user equipment, respectively, or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of supporting dynamic multipoint communication configuration.

Implementations of any of the above described blocks, apparatuses, systems, techniques or methods include, as non limiting examples, implementations as hardware, software, for example in connection with a digital signal processor, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

What is claimed is:

1. An apparatus, comprising:
   at least one processor; and
   at least one memory including computer program code, where the at least one memory and the computer program code are configured, with the at least one processor, to cause the apparatus to at least:
   define at least two different communication transmission sets for cellular-based communication between base station and terminal, wherein the at least two different communication transmission sets are indicated in a downlink reference signal configuration; and
   assign, using the downlink reference signal configuration, a communication transmission set of the at least two different communication transmission sets to use in a current transmission of the cellular-based communication.

2. The apparatus according to claim 1, wherein a first communication transmission set corresponds to a single cell transmission and a second communication transmission set corresponds to a transmission involving two neighboring cells with overlapping coverage area forming a serving sector and a neighboring sector.

3. The apparatus according to claim 2, wherein the two neighboring cells with overlapping coverage area are each served by a same base station.

4. The apparatus according to claim 2, wherein the second communication transmission set comprises information comprising at least one of a vertical shift in common reference signal patterns between the neighboring cells, identities of the neighboring cells, and a transmission sequence of the neighboring cells.

5. The apparatus according to claim 2, wherein the second communication transmission set includes information to trigger the terminal using an operation mode in which antenna ports of the neighboring sector are considered virtual antenna ports consecutively adding to the antenna ports of the serving sector.

6. The apparatus according to claim 1, wherein a definition of a communication transmission set relates to radio resource control signaling.

7. The apparatus according to claim 1, wherein the at least one memory including the computer program code is configured with the at least one processor to cause the apparatus to assign a communication transmission set based on downlink assignment signaling related to the current transmission.

8. The apparatus according to claim 1, wherein the at least two different communication transmission sets are indicated in at least one of an existing downlink assignment field and added bits of the downlink reference signal configuration.

9. The apparatus according to claim 1 embodying the base station.

10. An apparatus, comprising:
    at least one processor; and
    at least one memory including computer program code, where the at least one memory and the computer program code are configured, with the at least one processor, to cause the apparatus to at least:
    receive at least two different communication transmission sets for a cellular-based communication between base station and terminal, wherein the at least two different communication transmission sets are received in a downlink reference signal configuration; and
    based on the received downlink reference signal configuration, use an assigned communication transmission set of the at least two different communication transmission sets in the cellular-based communication between the base station and the terminal.

11. The apparatus according to claim 10 embodying the terminal.

12. A method, comprising:
    receiving, by a terminal, at least two different communication transmission sets for a cellular-based communication between base station and the terminal, wherein the at least two different communication transmission sets are received in a downlink reference signal configuration; and
    based on the received downlink reference signal configuration, using an assigned communication transmission set of the at least two different communication transmission sets in the cellular-based communication between the base station and the terminal.

13. The method according to claim 12, wherein the terminal comprises user equipment.

14. A method, comprising:
    defining, by a base station, at least two different communication transmission sets for cellular-based communication between the base station and a terminal, wherein the communication transmission sets are indicated in a downlink reference signal configuration; and
    assigning, using the downlink reference signal configuration, a communication transmission set to use in a current transmission of the cellular-based communication.

15. The method according to claim 14, wherein a first communication transmission set corresponds to a single cell transmission and a second communication transmission set corresponds to a transmission involving two neighboring cells with overlapping coverage area forming a serving sector and a neighboring sector.

16. The method according to claim 15, wherein the two neighboring cells with overlapping coverage area are each served by a same base station.

17. The method according to claim 15, wherein the second communication transmission set comprises information comprising at least one of a vertical shift in the common reference signal patterns between the neighboring cells, the identities of the neighboring cells and a transmission sequence of the neighboring cells.

18. The method according to claim 15, wherein the second communication transmission set includes information to trigger the terminal using an operation mode in which antenna ports of the neighboring sector are considered virtual antenna ports consecutively adding to the antenna ports of the serving sector.

19. The method according to claim 14, wherein defining a communication transmission set relates to radio resource control signaling.

20. The method according to claim 14, wherein assigning a communication transmission set includes downlink assignment signaling related to the current transmission.

21. A non-transitory computer readable medium comprising a computer program product embodying computer-executable components which when executed by a processor perform:
   defining at least two different communication transmission sets for cellular-based communication between base station and terminal, wherein the defined at least two different communication transmission sets are indicated in a downlink reference signal configuration; and
   assigning, using the downlink reference signal configuration, a communication transmission set to use in a current transmission related to the cellular-based communication.

22. The non-transitory computer readable medium according to claim 21, embodied as a computer-readable storage medium.

* * * * *